(12) United States Patent
Wang et al.

(10) Patent No.: US 11,602,101 B2
(45) Date of Patent: Mar. 14, 2023

(54) CRUSHER

(71) Applicant: INTRADIN (HUZHOU) PRECISION TECHNOLOGY CO., LTD., Zhejiang (CN)

(72) Inventors: Junliang Wang, Zhejiang (CN); Ping Li, Zhejiang (CN); Xin Zhang, Zhejiang (CN)

(73) Assignee: INTRADIN (HUZHOU) PRECISION TECHNOLOGY CO., LTD., Huzhou (CN)

( * ) Notice: Subject to any disclaimer, the term of this patent is extended or adjusted under 35 U.S.C. 154(b) by 118 days.

(21) Appl. No.: 16/987,718

(22) Filed: Aug. 7, 2020

(65) Prior Publication Data

US 2021/0394193 A1 Dec. 23, 2021

(30) Foreign Application Priority Data

Jun. 23, 2020 (CN) .......................... 202010576919.0

(51) Int. Cl.
*A01G 3/00* (2006.01)
*B02C 18/12* (2006.01)
(Continued)

(52) U.S. Cl.
CPC .............. *A01G 3/002* (2013.01); *B02C 18/12* (2013.01); *B02C 18/18* (2013.01)

(58) Field of Classification Search
CPC . B02C 18/0084; B02C 18/0092; B02C 18/12; B02C 18/304; B02C 18/362;
(Continued)

(56) References Cited

U.S. PATENT DOCUMENTS 2,679,981 A * 6/1954 Eisinga ................. E03C 1/2665
241/46.013
3,943,729 A * 3/1976 Dankel ................... F16D 7/025
241/32
(Continued)

FOREIGN PATENT DOCUMENTS

CN 203524431 U * 4/2014
CN 106824441 A * 6/2017 ............. B02C 18/08
(Continued)

OTHER PUBLICATIONS

Machine translation of EP 0099561, Retrieved from Espacenet Jan. 22, 2022, 10 Pages. (Year: 1984).*

(Continued)

*Primary Examiner* — Shelley M Self
*Assistant Examiner* — Mohammed S. Alawadi

(57) ABSTRACT

A crusher includes a blade assembly and a drive assembly. The blade assembly includes a first blade and a second blade. The drive assembly is respectively connected with the first blade and the second blade, and is configured to drive the first blade and the second blade to rotate. The first blade is configured to disperse and perform primary cutting of the materials. The second blade is configured to perform secondary cutting of the materials. The first blade makes the materials fully disperse, so that the second blade can fully cut the materials. In addition, the first blade initially cuts the materials, so that the formed fragments can achieve a better fertilization effect.

9 Claims, 4 Drawing Sheets

(51) Int. Cl.
  *B02C 18/18* (2006.01)
  *B02C 18/16* (2006.01)
  *B02C 18/22* (2006.01)
  *B02C 18/24* (2006.01)
  *B02C 21/02* (2006.01)
  *B02C 23/10* (2006.01)
  *C05F 11/00* (2006.01)

(58) Field of Classification Search
  CPC ......... B02C 18/18; A01G 3/002; E03C 1/266; E03C 1/2665; A47J 42/28; A47J 43/0722; A47J 43/0711; A01F 29/02; A01F 29/06; A01F 29/095
  USPC ............................................ 241/282.1, 292.1
  See application file for complete search history.

(56) References Cited

U.S. PATENT DOCUMENTS

| | | | | |
|---|---|---|---|---|
| 4,272,031 | A * | 6/1981 | Jines | B02C 18/0092 241/282.1 |
| 5,085,375 | A * | 2/1992 | Haworth | B02C 18/12 241/55 |
| 5,366,168 | A * | 11/1994 | Dymarkowski | C05F 11/00 241/101.761 |
| 2005/0167537 | A1* | 8/2005 | Chen | B02C 18/18 241/292.1 |
| 2008/0041998 | A1* | 2/2008 | Gillis | B02C 18/18 241/282.1 |
| 2011/0297765 | A1* | 12/2011 | Tulipani | A01G 20/47 241/62 |

FOREIGN PATENT DOCUMENTS

| | | | | |
|---|---|---|---|---|
| CN | 107716068 A | * | 2/2018 | ............ B02C 18/10 |
| CN | 108324138 A | * | 7/2018 | ............ A47J 43/046 |
| CN | 108991951 A | * | 12/2018 | ............ A47J 43/046 |
| CN | 109955329 A | | 7/2019 | |
| CN | 108114800 B | * | 11/2019 | ............ B02C 13/18 |
| CN | 110484324 A | | 11/2019 | |
| CN | 209901722 U | | 1/2020 | |
| DE | 3034378 A | * | 4/1982 | ............ B02C 18/08 |
| DE | 0099561 A2 | * | 2/1984 | ............ B02C 18/08 |
| WO | WO-2013188863 A1 | * | 12/2013 | ............ A01G 1/125 |

OTHER PUBLICATIONS

Aiko Shredder picture, Retrieved from https://www.simplerawandnatural.com/2012/03/alko-shredder.html, 4 Pages. (Year: 2012).*
Machine translation of DE 3034378, Retrieved from Espacenet Jan. 28, 2022, 3 Pages. (Year: 1982).*
Machine translation of CN 107716068, Retrieved from Espacenet Jan. 28, 2022, 5 Pages. (Year: 2018).*
Machine translation of CN 108114800, Retrieved from Espacenet Jan. 28, 2022, 6 Pages. (Year: 2019).*
Little Wonder Impeller, https://www.youtube.com/watch?v=utOcgOO638s&t=12s, May 21, 2015, Retrieved from YouTube Jul. 29, 2022. (Year: 2015).*
Billy Goat Debris Loader, https://www.youtube.com/watch?v=Y512JT1Hhto&t=45s, Jun. 11, 2013, Retrieved from YouTube Jul. 29, 2022. (Year: 2013).*
English translate (CN108991951A), retrieved date Dec. 28, 2022.*
English translate (CN108324138A), retrieved date Dec. 28, 2022.*

* cited by examiner

CRUSHER

CROSS-REFERENCE TO RELATED APPLICATION

This application claims the benefit of priority from Chinese Application No. 202010576919.0 with a filing date of Jun. 23, 2020. The content of the aforementioned applications, including any intervening amendments thereto, are incorporated herein by reference.

TECHNICAL FIELD

The present application relates to agricultural machinery, and more particularly to a crusher.

BACKGROUND

A leaf crusher is a machine that crushes leaves and makes the crushed leaves into pollution-free fertilizers. A large number of small branches and plant rhizomes are often doped in the recycling of leaves, and however, the existing leaf crusher cannot fully crush these small branches and plant rhizomes, so the effect of fertilization of the treated leaves is disappointing.

SUMMARY

The existing leaf crusher cannot fully crush the materials, so the fragments of the crushed materials fail to achieve a better fertilization effect. In view of the problem in the prior art, an object of the disclosure is to provide a crusher.

The present disclosure provides a crusher, comprising:
a blade assembly; and
a drive assembly;
wherein the blade assembly comprises a first blade and a second blade; the drive assembly is respectively connected to the first blade and the second blade, and drives the first blade and the second blade to rotate; the first blade is configured to disperse and perform primary cutting of materials; and the second blade is configured to perform secondary cutting of the materials.

In some embodiments, the first blade comprises a first main body and a protrusion arranged on the first main body, the drive assembly is connected to the first main body, the protrusion is configured to disperse the materials, and the first main body is configured to cut the materials which are dispersed.

In some embodiments, the second blade comprises a second main body and a baffle arranged on the second main body; the drive assembly is connected to the second main body, and the second main body is configured to further cut the materials into fragments. The baffle is configured to guide the discharge of the fragments cut by the second main body.

In some embodiments, the second main body comprises first sawteeth configured to cut the materials; and/or, the baffle comprises second sawteeth configured to cut the materials.

In some embodiments, the blade assembly further comprises a third blade, and the third blade is connected to the drive assembly; the third blade is located between the first blade and the second blade, and is configured to cut the materials.

In some embodiments, the blade assembly further comprises a connecting shaft; the connecting shaft is connected to the drive assembly; the first blade, the third blade and the second blade are respectively arranged on the connecting shaft; the drive assembly drives the connecting shaft to rotate; and the connecting shaft drives the first blade, the third blade and the second blade to rotate along the connecting shaft.

In some embodiments, the blade assembly also comprises a first limit sleeve and a second limit sleeve, the first limit sleeve is sheathed on the connecting shaft and is located between the first blade and the third blade, so as to form a gap between the first blade and the third blade; the second sleeve is located between the third blade and the second blade, so as to form a gap between the third blade and the second blade.

In some embodiments, the crusher further comprises a housing. The housing is provided with a feed port, a crushing cavity and a discharge port which communicate with each other; and the blade assembly is located in the crushing cavity.

In some embodiments, the housing comprises a first sub-housing, a second sub-housing and a third sub-housing connected which are sequentially connected from top to bottom; the feed port is located at a first end of the first sub-housing; a second end of the first sub-housing is connected with a first end of the second sub-housing and is retractable along the second sub-housing; a second end of the second sub-housing is connected to a first end of the third sub-housing, the crushing cavity is located in the third sub-housing, and the discharge port is located on a side wall of the third sub-housing.

In some embodiments, the crusher further comprises a screen mesh which is detachably provided at the discharge port.

BRIEF DESCRIPTION OF THE DRAWINGS

In order to explain the embodiments of the present disclosure or the technical solutions in the prior art more clearly, the drawings required in the embodiments or the description of the prior art will be briefly introduced as follows. Obviously, the drawings in the following description are only some embodiments of the present disclosure. For those of ordinary skill in the art, other drawings can be obtained without paying any creative efforts according to the structures shown in these drawings.

Figure 1:
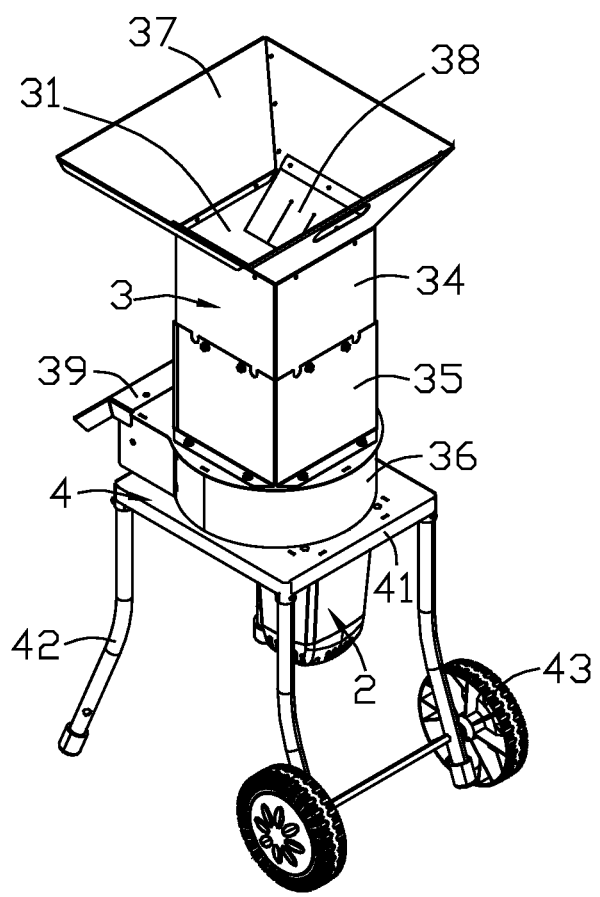
FIG. 1 is a schematic diagram of a crusher according to an embodiment of the present disclosure.
Figure 2:
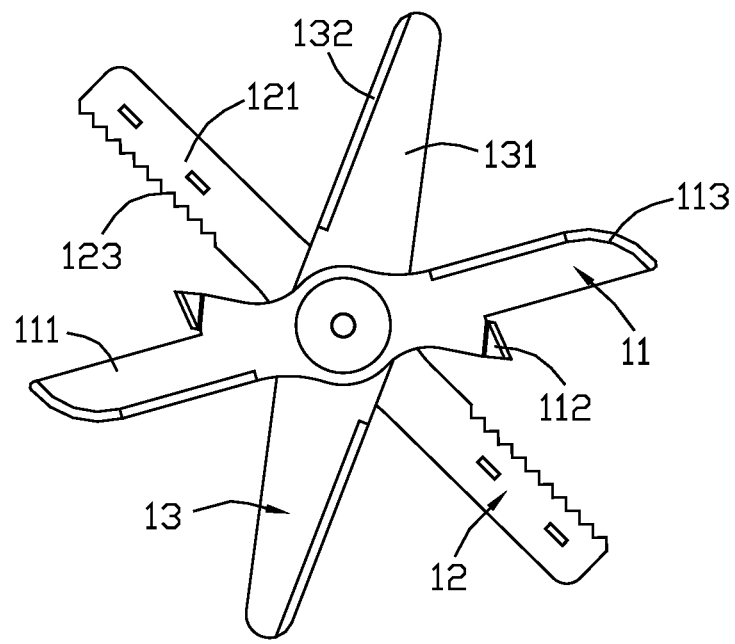
FIG. 2 is a top view of a blade assembly according to an embodiment of the present disclosure.

In the drawings: 10, crusher; 1, blade assembly; 11, first blade; 111, first main body; 112, protrusion; 113, first cutting edge; 12, second blade; 121, second main body; 122, baffle; 123, first sawteeth; 124, second sawteeth; 13, third blade; 131, third main body; 132, second cutting edge; 14, connecting shaft; 141, main body of connecting shaft; 142, resisting portion; 15, first limit sleeve; 16, the second limit sleeve; 17, spacer; 2, drive assembly; 3, housing; 31, feed port; 32, crushing cavity; 33, discharge port; 34, first sub-housing; 341, first end of the first sub-housing; 342, second end of the first sub-housing; 35, second sub-housing; 351, first end of the second sub-housing; 352, second end of the second sub-housing; 36, third sub-housing; 361, first end of the third sub-housing; 362, second end of the third sub-housing; 37, guide cover; 371, first end of the guide cover; 372, second end of the guide cover; 38, blocking plate; 39, limit cover; 391, first limit plate; 392, second limit plate; 393, third limit plate; 4, support frame; 41, support plate; 42, support feet; 43, wheel; 5, screen mesh.

DETAILED DESCRIPTION OF EMBODIMENTS

The disclosure will be further described clearly and completely below with reference to the accompanying drawings in embodiments. Obviously, the described embodiments are only a part of the embodiments of the present disclosure. Based on the embodiments of the present disclosure, all other embodiments obtained by a person of ordinary skill in the art without making creative efforts fall within the protection scope of the present disclosure.

It should be noted that all directional indications (such as up, down, left, right, front, rear, etc.) in the embodiments of the present disclosure only used to explain the relative position relationship, motion situation, etc. between the components under a certain attitude (as shown in the drawings). If the specific attitude changes, the directional indication will change accordingly.

In addition, terms "first", "second", etc. in the present disclosure are for descriptive purposes only, and cannot be construed as indicating or implying their relative importance or implicitly indicating the number of technical features indicated. Thus, the features defined as "first" and "second" may explicitly or implicitly include at least one of the features. In addition, "and/or" in the whole text includes three solutions, where, taking A and/or B as an example, the solutions include the technical solution A, the technical solution B and technical solutions A and B in combination. In addition, the technical solutions of various embodiments can be combined with each other if the combined technical solutions can be realized by the ordinary person in the prior art. When there are conflicts in the combination of technical solutions, or the combination of technical solutions cannot be realized, the combination of the technical solutions does not exist and is not within the scope of the appended claims.

As shown in FIGS. 1-5, the present disclosure provides a crusher 10, including a blade assembly 1 and a drive assembly 2. The blade assembly 1 includes a first blade 11 and a second blade 12. The drive assembly 2 is respectively connected to the first blade 11 and the second blade 12, and drives the first blade 11 and the second blade 12 to rotate. The first blade 11 is configured to disperse and perform cutting of materials, and the second blade 12 is configured to perform secondary cutting of the materials. The first blade 11 disperses the materials, so that the materials are well dispersed and sufficiently cut by the second blade 12. In addition, the first blade 11 can initially cut the materials, so that the formed fragments can achieve a better fertilization effect.

Preferably, the drive assembly 2 is a motor.

The crusher 10 further includes a housing 3 which is provided with a feed port 31, a crushing cavity 32 and a discharge port 33 that communicate with each other. The blade assembly 1 is located in the crushing cavity 32. A distance between the first blade 11 and the feed port 31 is smaller than a distance between the second blade 12 and the feed port 31.

The first blade 11 includes a first main body 111 and protrusions 112 arranged on the first main body 111. The drive assembly 2 is connected to the first main body 111. The protrusions 112 are configured to disperse the materials, and the first main body 111 is configured to cut the materials which are dispersed by the protrusions 112. The drive assembly 2 drives the first main body 111 to rotate, and the first main body 111 drives the protrusions 112 to rotate, so that the protrusions 112 disperse the materials which fall on the protrusions, and the second blade 12 fully cuts the materials.

Specifically, the protrusions 112 are arranged near a middle of the first main body 111, and is turned up along an edge of the first main body 111 towards the feed port 31.

At least two protrusions 112 are provided.

In some embodiments, the number of the protrusions 112 is two, and the two protrusions 112 are disposed relative to the middle of the first main body 111. Through the two protrusions 112, the dispersing efficiency of the materials is improved.

In some embodiments, the protrusions 112 are of a triangular structure which turns upward. Alternatively, the protrusions 112 may also be other polygonal structures that turn upward.

Both ends of the first main body 111 are arc-shaped structures. This structure can reduce the resistance during crushing, thereby improving the crushing efficiency of the crusher 10.

Both ends of the first main body 111 are provided with a first cutting edge 113 which performs the primary cutting of the materials.

The second blade 12 includes a second main body 121 and baffles 122 provided on the second main body 121. The drive assembly 2 is connected to the second main body 121. The second main body 121 is configured to perform secondary cutting of the materials to form fragments. The baffles 122 are configured to discharge the fragments cut by the second main body 121. The drive assembly 2 drives the second main body 121 to rotate, and the second main body 121 drives the baffles 122 to rotate. The baffles 122 push the fragments cut by the second main body 121 to move, so that the fragments can be discharged quickly.

Specifically, the baffles 122 are arranged on a bottom of the second main body 121.

The second main body 121 includes first sawteeth 123 for cutting the materials. Through the first sawteeth 123, small branches and plant rhizomes in the materials can be crushed, thereby improving the crushing degree of the fragments.

Specifically, both ends of the second main body 121 include the first sawteeth 123. The first sawteeth 123 increase the crushing efficiency of the crusher 10.

The number of baffles 122 is at least two.

In some embodiments, the number of the baffles 122 is two, and the two baffles 122 are disposed at both ends of the second main body 121. By providing the two baffles 122 on the second main body 121, the discharge efficiency of fragments is improved.

The baffles 122 include second sawteeth 124, which increases the crushing degree of fragments.

The blade assembly 1 further includes a third blade 13. The third blade 13 which is configured to cut the materials is connected to the drive assembly 2, and is located between the first blade 11 and the second blade 12. The third blade 13 improves the crushing efficiency of the crusher 10.

The third blade 13 includes a third main body 131, and the drive assembly 2 is connected to the third main body 131. Both ends of the third main body 131 are provided with a second cutting edge 132, through which the materials can be sufficiently crushed.

The width of the third main body 131 gradually decreases from the middle to the two ends. This structure can increase the strength of the third blade 13, thereby increasing the service life of the third blade 13.

In some embodiments, the third main body 131 has a diamond structure.

Figure 3:
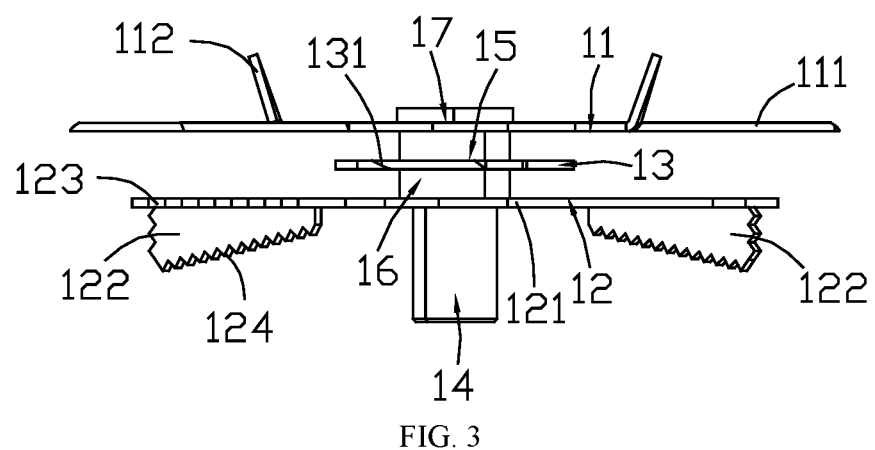
FIG. 3 is a front view of the blade assembly according to an embodiment of the present disclosure.
Figure 4:
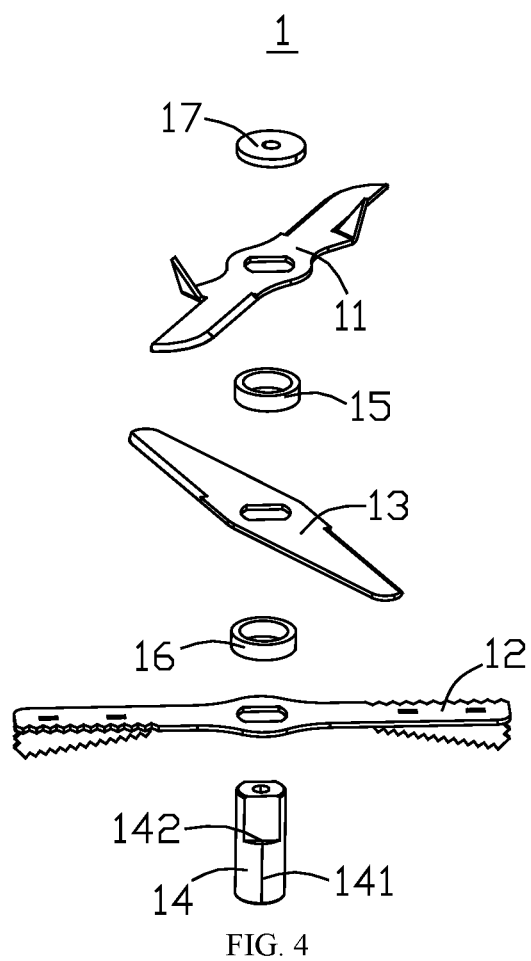
FIG. 4 is an exploded view of the blade assembly according to an embodiment of the present disclosure.

As shown in FIGS. 3 and 4, the blade assembly 1 further includes a connecting shaft 14, a first limit sleeve 15 and a second limit sleeve 16. The connecting shaft 14 is connected to the drive assembly 2. The first blade 11, the third blade 13 and the second blade 12 are sheathed on the connecting shaft 14, respectively. The first limit sleeve 15 is sheathed on the connecting shaft 14, and is located between the first blade 11 and the third blade 13, so that a gap is formed between the first blade 11 and the third blade 13. The second limit sleeve 16 is sheathed on the connecting shaft 14, and is located between the third blade 13 and the second blade 12, so that a gap is formed between the third blade 13 and the second blade 12. The drive assembly 2 drives the connecting shaft 14 to rotate, and the connecting shaft 14 simultaneously drives the first blade 11, the third blade 13 and the second blade 12 to rotate. The first limit sleeve 15 and the second limit sleeve 16 can reliably fix the first blade 11, the third blade 13 and the second blade 12 on the connecting shaft 14 to prevent the slipping of the first blade 11, the third blade 13 and the second blade 12 during rotation, thereby ensuring the crushing efficiency of the crusher 10. The first limit sleeve 15 and the second limit sleeve 16 can separate the first blade 11, the third blade 13 and the second blade 12 from each other, so that the first blade 11, the third blade 13 and the second blade 12 can crush the materials more fully, thereby improving the crushing degree of the crusher 10.

The connecting shaft 14 includes a main body 141 of connecting shaft and a resisting portion 142 provided on the main body 141 of connecting shaft. The first blade 11, the second blade 12, and the third blade 13 each are provided with a through hole which fits the connecting shaft 14. The second blade 12 is sheathed on the main body 141 of connecting shaft and abuts against the resisting portion 142. The second limit sleeve 16 is sheathed on the main body 141 of connecting shaft and abuts against the second blade 12. The third blade 13 is sheathed on the main body 141 of connecting shaft and abuts against the second limit sleeve 16. The first limit sleeve 15 is sheathed on the main body 141 of connecting shaft and abuts against the third blade 13. The first blade 11 is sheathed on the main body 141 of connecting shaft and abuts against the first limit sleeve 15. The first blade 11 is provided with a spacer 17, and a locking screw passes through the spacer 17 and the main body 141 of connecting shaft, so as to fix the first blade 11, the first limit sleeve 15, the third blade 13, the second limit sleeve 16 and the second blade 12 on the main body 141 of connecting shaft.

Figure 5:
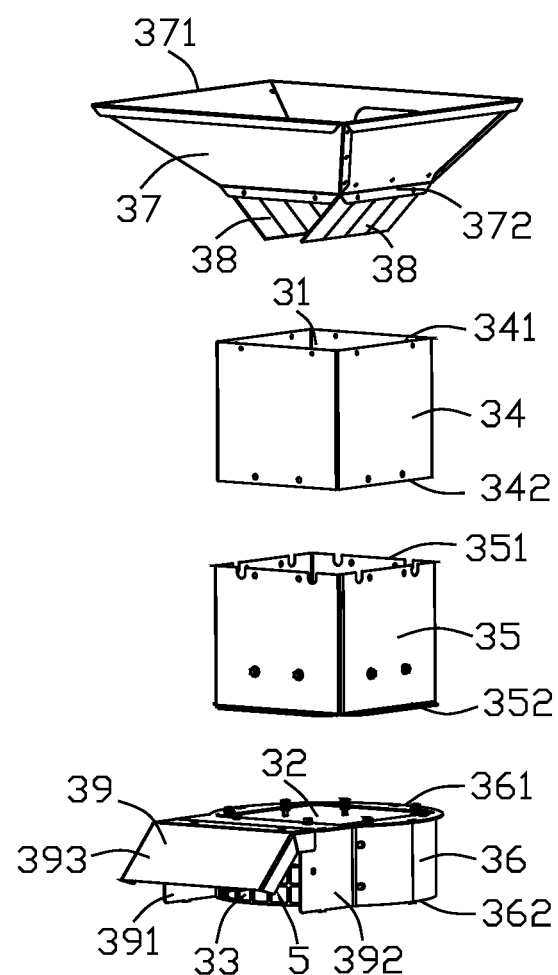
FIG. 5 is an exploded view of a housing according to an embodiment of the present disclosure.

As shown in FIGS. 1 and 5, the crusher 10 further includes a support frame 4 and a screen mesh 5. The support frame 4 includes a support plate 41 and support feet 42 configured to support the support plate 41. The housing 3 is arranged on a top of the support plate 41, the drive assembly 2 is arranged at a bottom of the support plate 41, and the blade assembly 1 is arranged in the housing 3. A drive shaft of the drive assembly 2 passes through the support plate 41 and is connected to the blade assembly 1. The drive assembly 2 is configured to drive the blade assembly 1 to rotate, so that the blade assembly 1 crushes the materials.

The screen mesh 5 is detachably arranged at the discharge port 33. The size of the discharged fragments can be controlled by replacing the screen meshes 5 which have holes of different sizes, thereby improving the applicability of the crusher 10.

The housing 3 includes a first sub-housing 34, a second sub-housing and a third sub-housing 36 connected in sequence. The feed port 31 is located at a first end 341 of the first sub-housing 34. A second end 342 of the first sub-housing 34 is connected to a first end 351 of the second sub-housing 35 and is retractable along the second sub-housing 35. A second end 352 of the second sub-housing 35 is connected to a first end 361 of the third sub-housing 36. A second end 362 of the third sub-housing 36 is arranged on the support plate 41. The crushing cavity 32 is located in the third sub-housing 36. The discharge port 33 is located on a side wall of the third sub-housing 36. During the transportation of the crusher 10, the first sub-housing 34 which is retractable can reduce its transportation cost through saving the packaging volume.

In some embodiments, the first sub-housing 34 and the second sub-housing 35 are both hollow quadrangular housings, and the third sub-housing 36 is a hollow cylindrical housing.

The housing 3 further includes a guide cover 37. The guide cover 37 covers the first end 341 of the first sub-housing 34, which can guide the materials from the feed port 31 into the crushing cavity 32. The guide cover 37 guides the materials into the crushing cavity 32 from the feed port 31, so as to prevent the materials from scattering on the ground during the pouring process, thereby improving the crushing efficiency of the crusher 10.

Specifically, cross-sectional areas of the guide cover 37 gradually decrease from a first end 371 of the guide cover to a second end 372 of the guide cover. The first end 371 of the guide cover 37 is close to the first sub-housing 34, and the second end 372 of the guide cover 37 is away from the first sub-housing 34.

In some embodiments, a cross-section of the guide cover 37 is square. Alternatively, the cross-section of the guide cover 37 may also be of other shapes.

Blocking plates 38 are provided at the feed port 31 to prevent the materials from jumping out of the feed port from the crushing cavity 32. The blocking plates 38 can prevent hard objects of the materials from jumping out of the feed port from the crushing cavity 32 when the blade assembly 1 rotates, so as to improve the safety of the crusher 10.

The blocking plates 38 are arranged at the second end 372 of the guide cover 37 in inclined manner, and the blocking plates 38 incline to a direction along which the materials flow into the housing.

The number of blocking plates 38 is at least two.

In some embodiments, the number of the blocking plates 38 is two, and the two blocking plates 38 are arranged oppositely.

The housing 3 further includes a limit cover 39 which is arranged on a side wall of the third sub-housing 36 and is configured to limit the movement range of the fragments discharged from the discharge port 33. The limit cover 39 limits the movement range of the fragments to prevent the fragments from being scattered on the ground, thereby improving the recycling efficiency of the fragments.

The limit cover 39 includes a first limit plate 391, a second limit plate 392, and a third limit plate 393. The third limit plate 393 is arranged at the first limit plate 391 and the second limit plate 392 and is inclined downward. The first limit plate 391 and the second limit plate 392 are located at both sides of the discharge port 33. A distance between the first limit plate 391 and the second limit plate 392 is larger than a width of the discharge port 33. A height of the first limit plate 391 and the second limit plate 392 is larger than a height of the discharge port 33. The first limit plate 391 and the second limit plate 392 can limit the crushed fragments to move between the first limit plate 391 and the second limit plate 392. The third limit plate 393 can limit the crushed fragments to move downward.

The length of the discharge port 33 is d, and the maximum length of the crushing cavity 32 is D, where D/2≤d≤D. Longer length of discharge port 33 leads to increased discharge speed of the fragments, thereby facilitating the discharging of the materials.

The support feet 42 are detachably provided on the support plate 41. During the transportation process of the crusher 10, the support feet 42 can be removed to save the packing volume, so as to reduce the transportation cost.

A plurality of wheels 43 are provided on the support feet 42. During the transportation of the crusher 10, the crusher 10 can be easily moved by the wheels 43.

In some embodiments, the wheels 43 are universal wheels.

The working process of the crusher is described as follows.

When crushing the materials, the drive assembly 2 is started, and the drive assembly 2 drives the blade assembly 1 to rotate. The materials are manually fed into the crushing cavity 32 through the feed port 31 of the housing 3, and crushed by the blade assembly 1 in the crushing cavity 32. The crushed fragments are discharged from the discharge port 33 of the housing 3 through the screen mesh 5, so as to complete the whole crushing process.

The above are only the preferred embodiments of the present disclosure, and are not intended to limit the scope of the present disclosure. Equivalent changes based on the description and accompanying drawings of the present disclosure without departing from the concepts of the present disclosure or uses of the present invention in other related technical fields shall fall within the scope of the present invention.

What is claimed is:

1. A crusher, comprising:
a blade assembly, and
a drive assembly;
wherein the blade assembly comprises a first blade and a second blade; the drive assembly is respectively connected to the first blade and the second blade, and drives the first blade and the second blade to rotate; the first blade is configured to disperse and perform primary cutting of materials; and the second blade is configured to perform secondary cutting of the materials;
wherein the first blade comprises a first main body and two protrusions diagonally arranged about a middle portion of the first main body, and the drive assembly is connected to the first main body; each of the protrusions is a polygonal structure that turns upward from the first main body and is configured to disperse the materials, and both ends of the first main body are formed with a first cutting edge to cut the materials which are dispersed, and the two protrusions are located at opposite sides of the first cutting edges near the middle portion.

2. The crusher of claim 1, wherein the second blade comprises a second main body and a baffle arranged on a lower side of the second main body; the drive assembly is connected to the second main body, and the second main body is configured to further cut the materials into fragments; a lower edge and a side edge of the baffle are provided with first sawteeth and the baffle is configured to guide the discharge of the fragments cut by the second main body.

3. The crusher of claim 2, wherein the second main body comprises second sawteeth configured to cut the materials; and the baffle comprises the first sawteeth configured to cut the materials.

4. The crusher of claim 1, wherein the blade assembly further comprises a third blade, and the third blade is connected to the drive assembly; the third blade is located between the first blade and the second blade, and is configured to crush the materials.

5. The crusher of claim 4, wherein the blade assembly further comprises a connecting shaft; the connecting shaft is connected to the drive assembly; the first blade, the third blade and the second blade are respectively arranged on the connecting shaft; the drive assembly drives the connecting shaft to rotate, and the connecting shaft drives the first blade, the third blade and the second blade to rotate along with the connecting shaft.

6. The crusher of claim 5, wherein the blade assembly further comprises a first limit sleeve and a second limit sleeve; the first limit sleeve is sheathed on the connecting shaft and is located between the first blade and the third blade, so as to form a gap between the first blade and the third blade; and the second limit sleeve is sheathed on the connecting shaft and is located between the third blade and the second blade, so as to form a gap between the third blade and the second blade.

7. The crusher of claim 1, further comprising a housing; wherein the housing is provided with a feed port, a crushing cavity and a discharge port which communicate with each other; and the blade assembly is located in the crushing cavity.

8. The crusher of claim 7, wherein the housing comprises a first sub-housing, a second sub-housing and a third sub-housing which are connected in sequence; the feed port is located at a first end of the first sub-housing; a second end of the first sub-housing is connected to a first end of the second sub-housing and is retractable along the second sub-housing; a second end of the second sub-housing is connected to a first end of the third sub-housing; the crushing cavity is located in the third sub-housing; and the discharge port is located on a side wall of the third sub-housing.

9. The crusher of claim 7, further comprising a screen mesh which is detachably provided at the discharge port.

* * * * *